Figure 1:
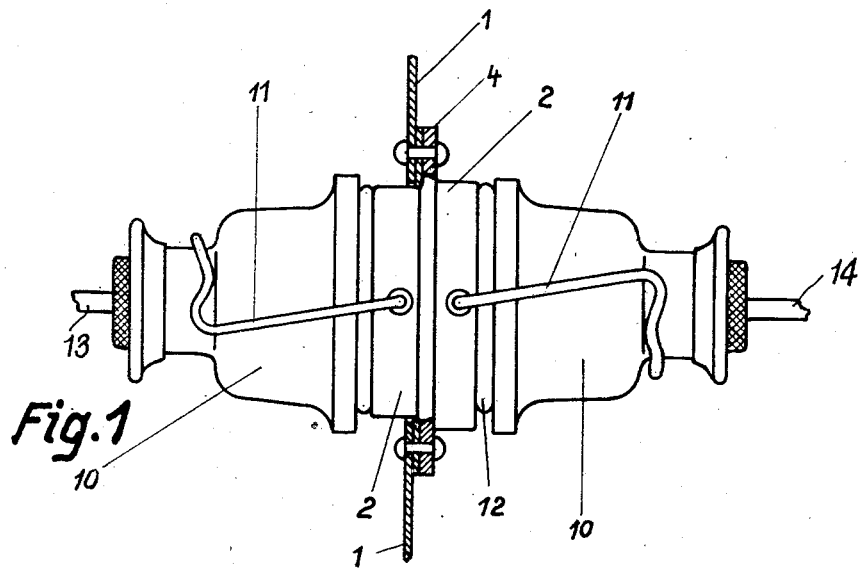

Dec. 9, 1941.   F. BORCHERT   2,265,341
AIR- AND GAS-TIGHT WALL LEAD-THROUGH FOR ELECTRIC WIRING SYSTEMS,
PARTICULARLY IN HIGH ALTITUDE AIRCRAFT
Filed July 29, 1939

Inventor:
F. Borchert
By Robb & Robb
Attorneys

Patented Dec. 9, 1941

2,265,341

UNITED STATES PATENT OFFICE 2,265,341

AIR- AND GAS-TIGHT WALL LEAD-THROUGH FOR ELECTRIC WIRING SYSTEMS, PARTICULARLY IN HIGH ALTITUDE AIRCRAFT

Fritz Borchert, Berlin-Britz, Germany, assignor to the firm: Henschel Flugzeug-Werke Aktiengesellschaft, Schonefeld, Kreis Teltow, Germany Application July 29, 1939, Serial No. 287,412
In Germany July 2, 1938

1 Claim. (Cl. 173—328)

This invention relates to air- and gas-tight wall leads-through for electric wiring systems in aircraft, and particularly in high altitude aircraft having chambers subjected to internal and external excess pressure.

Air-tight leads-through for elements of control rod systems, which allow of the movement of the parts of such rod systems, have already been provided in the walls of sealed chambers in high altitude aircraft. The electric wiring of an aircraft of this kind likewise requires to be taken through the walls of the pressure chambers in an air-tight manner, and in the case of leads-through for wiring there are very considerable additional difficulties to be overcome owing to the necessity of providing for simple and rapid installation and dismantling of the wiring and of effectually insulating the current-carrying parts of the wiring from the chamber wall in which the lead-through is provided.

The invention provides a particularly advantageous form of air-tight wall lead-through for electric wiring systems in the pressure chambers of high altitude aircraft.

The wall lead-through comprises a relatively shallow hollow body wherein a body of elastic electrically non-conductive material is seated under compression which shuts off the opening of the wall lead-through in a gas- and air-tight manner and in which elongated and centrally offset electric contact elements are non-displaceably secured, the two ends of which freely project and form quickly attachable and detachable plug connections with companion contact elements disposed in plugs at the ends of the wiring conductors to be connected. The elastic material receiving cavity may be formed by suitably shaping the portion of the chamber wall surrounding the opening or by providing an annular profiled member adapted to cup the opening and attached to the wall in an air-tight manner. The inner wall of the hollow body is preferably formed of two parts that can be screwed into one another and constitute hollow cylinders formed with shoulders which support plates shutting off the cavity from the outside. The elastic packing encased in this way, by screwing the parts of the hollow body into one another, can be so compressed that it will cling to all points in an air-tight manner.

The elongated contact elements provided in the packing may take the form of pins or bushes, and when this packing consists of rubber these elements may be vulcanized in position therein. The compression exerted upon the packing will have the effect of pressing it into air-tight contact with the said elements.

Preferably, the part or parts forming the cavity for the packing are so constructed as to be capable of receiving electric plugs of different shapes.

Figure 2:
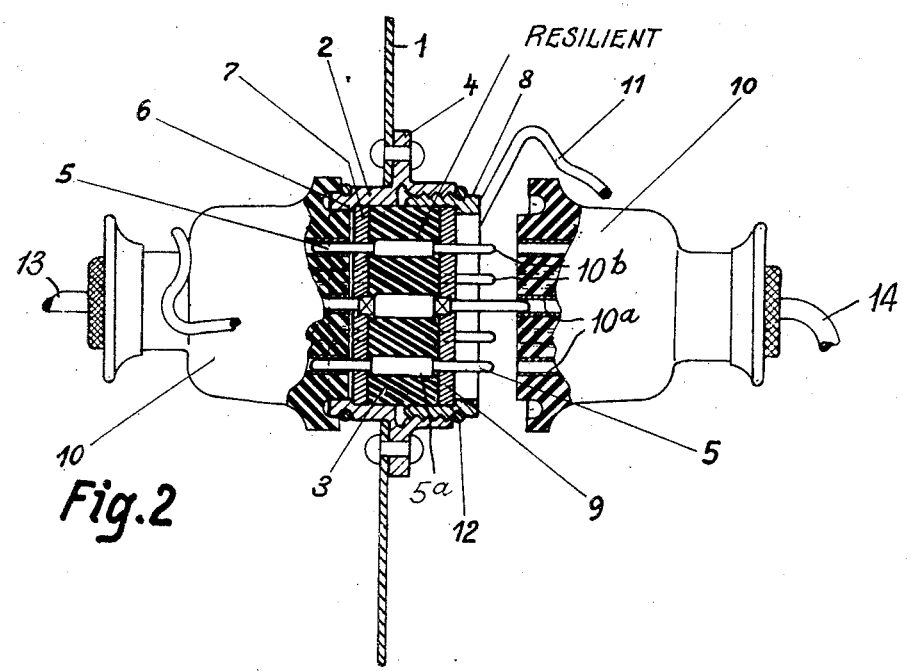

One embodiment of the invention is shown, by way of example, in the accompanying drawing, in which:

Fig. 1 is a side elevation and Fig. 2 is a similar view, partly in section.

Referring to the drawing, like parts are indicated by the same reference numerals. The opening provided in a chamber wall 1 of an aircraft, particularly high altitude aircraft, to accommodate a lead-through is sealed by means of a packing 3 of elastic and electrically non-conductive material, for instance, rubber, which is seated in the cavity of a hollow body 2 attached to the wall 1 in an air-tight manner by means of a flange 4. A portion of the inner wall of the cylindrical hollow body is formed by a screw-in member 8. In the elastic packing 3 are provided elongated contact elements which are non-displaceably and closely arranged by means of central offsets 5a and which traverse this packing from side to side and which are suitable for detachably connecting together electric wiring conductors 13, 14, these elements being in the present instance plug pins 5 projecting out of the packing 3 on both sides. In the embodiment shown, the packing is prevented from bulging, in the region of the opening, by the provision on both sides of loosely inserted rigid plates 7, 9 bearing against shoulders 6 on the parts 2 and 8 respectively. The plates 7 and 9 are perforated for passage of the contact elements and consist of suitable insulating material.

10a are contact bushes to be pushed on the plug pins 5 and arranged at the ends of the wiring conductors 13, 14 in plugs 10 which are particularly easy to handle. The hollow cylinder members 2, 8 extend beyond the plates 7, 9 and form at their ends annular rims which serve for safely guiding the ends 10b of the pins 5 into the bushes 10a. Movable clips 11 secure the plugs 10 against sliding off from the pins 5. 12 denotes gasket rings of elastic material for sealing the joints between the plugs 10 and the socket body 2.

I claim:

In a multiple conductor wiring system for aircraft, particularly high altitude aircraft, having at least one wall subdividing the aircraft into chamber-like compartments in which the multiple conductor wiring in one compartment is to be connected to the multiple conductor wiring in another compartment, a hollow body adapted to be mounted in the wall aforesaid in a gas-and air-tight relation thereto, an elastic electrically insulating mass compressed in said hollow body and maintained under compression therein, a plurality of relatively fixed electrical conductor members disposed in said insulating mass in non-displaceable gas- and air-tight relation to the same, and projecting to opposite sides of the wall for connection with the wiring in the compartments at opposite sides of the wall, and portable plug means detachably connected to opposite sides of the hollow body and fittingly guided thereon, said plug means each including a plurality of electrical conductor members complementary to and engageable with the relatively fixed conductor members in the insulating mass and adapted to be connected with the corresponding ends of the multiple conductor wirings in the respective compartments so that the wirings in the compartments will be conductively connected in circuit through the wall when the plug means are connected with the hollow body.

FRITZ BORCHERT.